United States Patent
Nomura et al.

(10) Patent No.: US 10,684,369 B2
(45) Date of Patent: Jun. 16, 2020

(54) DRIVING ASSISTANCE DEVICE AND DRIVING ASSISTANCE METHOD

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Takuya Nomura, Kariya (JP); Akihiro Kida, Toyota (JP); Motonari Obayashi, Nagakute (JP)

(73) Assignees: DENSO CORPORATION, Kariya, Aichi-Pref (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 340 days.

(21) Appl. No.: 15/740,604

(22) PCT Filed: Jun. 7, 2016

(86) PCT No.: PCT/JP2016/066875
§ 371 (c)(1),
(2) Date: Dec. 28, 2017

(87) PCT Pub. No.: WO2017/002548
PCT Pub. Date: Jan. 5, 2017

(65) Prior Publication Data
US 2018/0156916 A1    Jun. 7, 2018

(30) Foreign Application Priority Data

Jun. 30, 2015 (JP) ................. 2015-131130

(51) Int. Cl.
*G01S 15/93* (2020.01)
*B60R 21/00* (2006.01)
(Continued)

(52) U.S. Cl.
CPC ........ *G01S 15/931* (2013.01); *B60K 31/0008* (2013.01); *B60R 21/00* (2013.01);
(Continued)

(58) Field of Classification Search
CPC .... G01S 15/931; G01S 7/52004; G01S 7/529; G01S 7/539; G01S 2007/52009;
(Continued)

(56) References Cited

U.S. PATENT DOCUMENTS 6,431,001 B1 * 8/2002 Tsuzuki ................. G01N 29/12
                                                                73/436
6,492,902 B2 * 12/2002 Nishimoto .......... G01S 7/52004
                                                                340/435

(Continued)

FOREIGN PATENT DOCUMENTS

JP      63-087579 U    6/1988
JP      H06-003437 A    1/1994
(Continued)

*Primary Examiner* — Nicholas Kiswanto
(74) *Attorney, Agent, or Firm* — Maschoff Brennan

(57) ABSTRACT

A driving assistance device that detects an object around the own vehicle by using an ultrasonic sensor mounted on the own vehicle and performs driving assistance control of the own vehicle. The driving assistance device drives an oscillator of the ultrasonic sensor so that ultrasonic waves are transmitted from the oscillator. The driving assistance device acquires a duration and a frequency of reverberation occurring in association with driving of the oscillator. The driving assistance device determines, on a basis of the acquired duration and frequency of the reverberation, whether an oscillation characteristic of the reverberation has changed. The driving assistance device changes, on a basis of a result of determination of the oscillation characteristic of the reverberation, at least one execution mode of the (Continued)

driving assistance control and determination of abnormality in the driving assistance control.

15 Claims, 5 Drawing Sheets

(51) Int. Cl.
| | | |
|---|---|---|
| *G08G 1/16* | (2006.01) | |
| *G01S 7/52* | (2006.01) | |
| *B60K 31/00* | (2006.01) | |
| *G01S 7/529* | (2006.01) | |
| *B60R 21/013* | (2006.01) | |
| *B60W 30/085* | (2012.01) | |
| *B60W 30/095* | (2012.01) | |
| *G01S 7/539* | (2006.01) | |
| *G01S 15/931* | (2020.01) | |

(52) U.S. Cl.
CPC ......... *B60R 21/013* (2013.01); *B60W 30/085* (2013.01); *B60W 30/095* (2013.01); *G01S 7/52004* (2013.01); *G01S 7/529* (2013.01); *G01S 7/539* (2013.01); *G08G 1/165* (2013.01); *G08G 1/166* (2013.01); *G08G 1/168* (2013.01); *G01S 2007/52009* (2013.01)

(58) Field of Classification Search
CPC ... B60K 31/0008; B60R 21/00; B60R 21/013; B60W 30/085; B60W 30/095
See application file for complete search history.

(56) References Cited

U.S. PATENT DOCUMENTS

| | | | |
|---|---|---|---|
| 8,502,653 B2 * | 8/2013 | Tsuzuki | G01S 7/52004 340/425.5 |
| 9,632,177 B2 * | 4/2017 | Inagaki | G01S 15/02 |
| 10,094,923 B2 * | 10/2018 | Mossau | G01S 15/931 |
| 2002/0023498 A1 | 2/2002 | Tsuzuki et al. | |
| 2002/0047780 A1 | 4/2002 | Nishimoto et al. | |
| 2009/0207006 A1 * | 8/2009 | Richter | G01S 7/52004 340/435 |
| 2009/0224959 A1 | 9/2009 | Matsukawa | |
| 2016/0207532 A1 | 7/2016 | Kida | |
| 2017/0197612 A1 * | 7/2017 | Rostocki | G01S 15/931 |

FOREIGN PATENT DOCUMENTS

| | | |
|---|---|---|
| JP | H06-331743 | 12/1994 |
| JP | 2002-131428 A | 5/2002 |
| JP | 2002-148347 A | 5/2002 |
| JP | 2009-210404 A | 9/2009 |
| JP | 2010-181208 | 8/2010 |
| JP | 2015-049665 A | 3/2015 |

\* cited by examiner

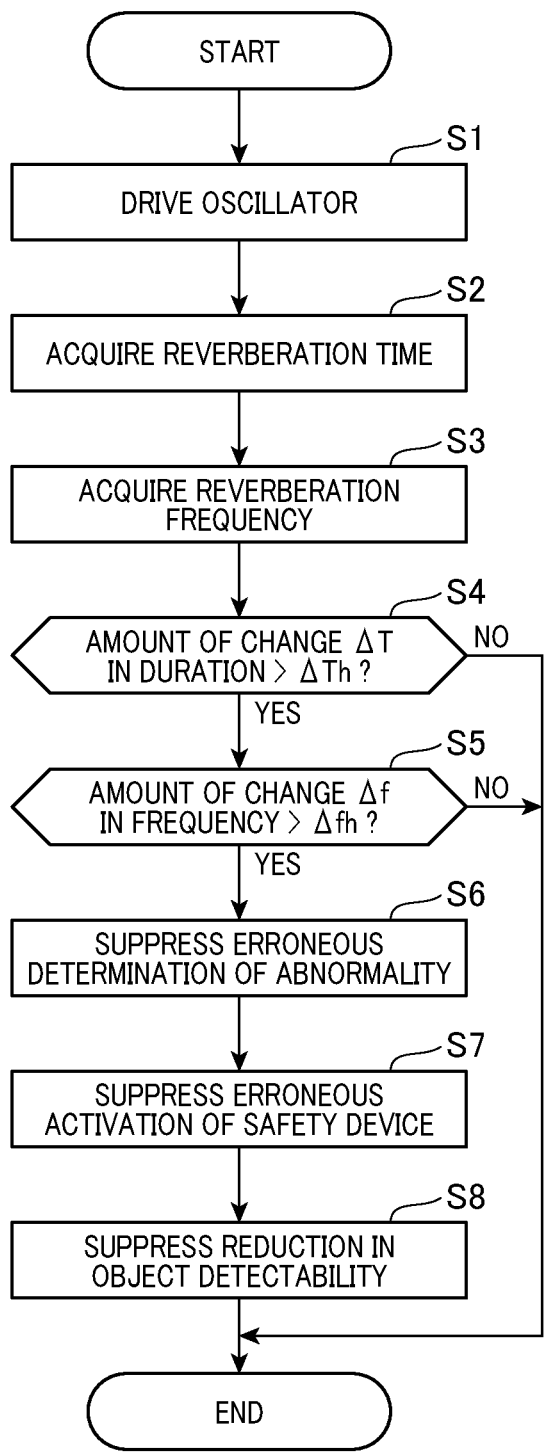

DRIVING ASSISTANCE DEVICE AND DRIVING ASSISTANCE METHOD

CROSS-REFERENCE TO RELATED APPLICATION

This application is based on and claims the benefit of priority from earlier Japanese Patent Application No. 2015-131130 filed on Jun. 30, 2015, the description of which is incorporated herein by reference.

TECHNICAL FIELD

The present disclosure relates to a driving assistance technique for assisting driving of a vehicle by using a result of detection performed by an ultrasonic sensor.

BACKGROUND ART

A device in which, in order to provide driving assistance for a vehicle, an obstacle located around the vehicle is detected by an ultrasonic sensor mounted on the vehicle has previously been proposed. According to such a device, abnormal operation of the ultrasonic sensor may cause a decrease in accuracy for detecting an obstacle. Thus, the device determines whether or not the ultrasonic sensor is operating normally.

For example, an obstacle detection device described in Patent Literature 1 determines that a permanent failure has occurred due to breaking of a wire or the like, when, after an oscillator of an ultrasonic sensor stops being driven, no reverberation signal is outputted from the oscillator. Furthermore, the obstacle detection device determines that a temporary failure has occurred due to freezing, contamination, or the like of the oscillator, when, after the oscillator stops being driven, a reverberation signal outputted from the oscillator is shorter than a normal time.

CITATION LIST

Patent Literature

[PTL 1] JP H6-3437 A

SUMMARY OF THE INVENTION

Technical Problem

It has been found that, for example, when due to rainfall or the like, rainwater or the like is flowing on a surface of an oscillator of an ultrasonic sensor, a reverberation signal becomes longer and reverberation is erroneously recognized as a reflected wave from a short distance (erroneous detection of short distance occurs). However, the above obstacle detection device cannot determine that a fluid such as rainwater is flowing on a surface of the oscillator. Thus, according to the obstacle detection device, in order to reduce the erroneous detection of the short distance, a predetermined region located at a short distance needs to be a dead zone, regardless of whether a fluid is flowing on the surface of the oscillator. Accordingly, when the above-mentioned obstacle detection device is applied to a vehicle, a range for detecting an obstacle becomes narrower and this may cause a decrease in opportunity for driving assistance.

An object of the present disclosure is to provide a driving assistance device capable of providing appropriate driving assistance when a fluid is flowing on a surface of an oscillator of an ultrasonic sensor and a driving assistance method performed by the driving assistance device.

Solution to Problem

A driving assistance device of the present disclosure is a device that detects an object around the own vehicle by using an ultrasonic sensor mounted on the own vehicle and performs driving assistance control of the own vehicle, the driving assistance device including a drive section, a reverberation acquisition section, a characteristic determination section, and a mode changing section. The drive section drives an oscillator of the ultrasonic sensor so that ultrasonic waves are transmitted from the oscillator. The reverberation acquisition section acquires a duration and a frequency of reverberation occurring in association with driving of the oscillator. The characteristic determination section determines, on a basis of the duration and the frequency which have been acquired by the reverberation acquisition section, whether an oscillation characteristic of the reverberation has changed. The mode changing section changes, on a basis of a result of determination of the oscillation characteristic which has been made by the characteristic determination section, at least one execution mode of the driving assistance control and determination of abnormality for determining whether an abnormality is present in the driving assistance control.

The driving assistance device of the present disclosure drives the oscillator of the ultrasonic sensor so that ultrasonic waves are transmitted, and acquires the duration and the frequency of the reverberation occurring in association with the driving of the oscillator. On the basis of the acquired duration and frequency of the reverberation, the driving assistance device determines that the oscillation characteristic of the reverberation has changed. In general, an ultrasonic sensor is embedded in a body or a body exterior component of a vehicle. Thus, when rainwater or the like flows (flowing water is present) on a surface of the body or the body exterior component, consecutive drops of the rainwater or the like flow in a region including a surface of an oscillator of the ultrasonic sensor and an area around the surface. In such a case, oscillation of the oscillator is transmitted to the rainwater or the like flowing in the region including the surface of the oscillator and the area around the surface, and due to spread of the oscillation, an oscillation characteristic of reverberation changes. Thus, on the basis of the result of the determination of the oscillation characteristic of the reverberation, the driving assistance device changes at least one execution mode of the driving assistance control and the determination of abnormality for determining whether an abnormality is present in the driving assistance control. This allows the driving assistance device of the present disclosure to provide appropriate driving assistance when a fluid is flowing on a surface of the oscillator.

BRIEF DESCRIPTION OF THE DRAWINGS

FIG. 6 is a flow chart showing a procedure for changing an execution mode of determination of abnormality and driving assistance control.

DESCRIPTION OF THE EMBODIMENTS

The following description will discuss an embodiment of a driving assistance device of the present disclosure with reference to drawings. It is assumed that the driving assistance device in accordance with the present embodiment detects an object around the own vehicle 50 by using, as a clearance sonar, an ultrasonic sensor 20 mounted on the own vehicle 50 and performs driving assistance control of the own vehicle 50.

Figure 1:
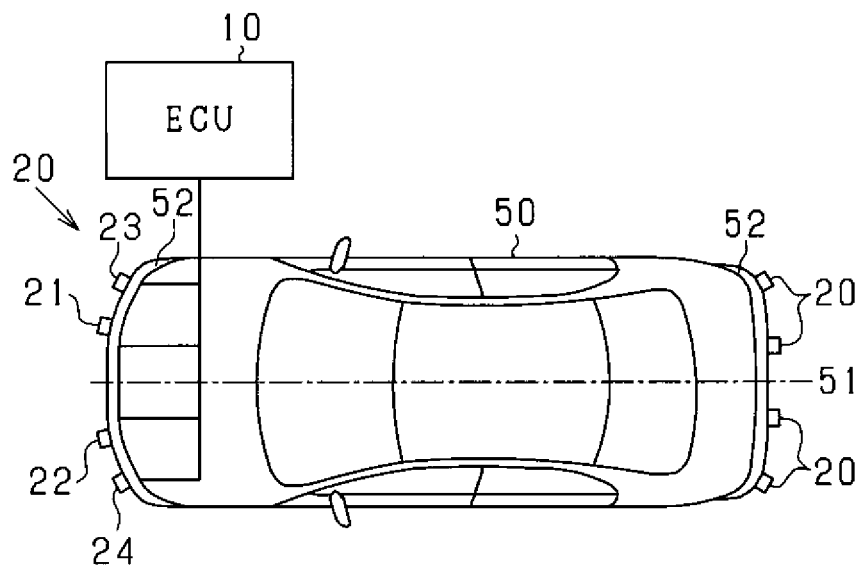
FIG. 1 is a top view showing a mounting position of an ultrasonic sensor.
Figure 2:
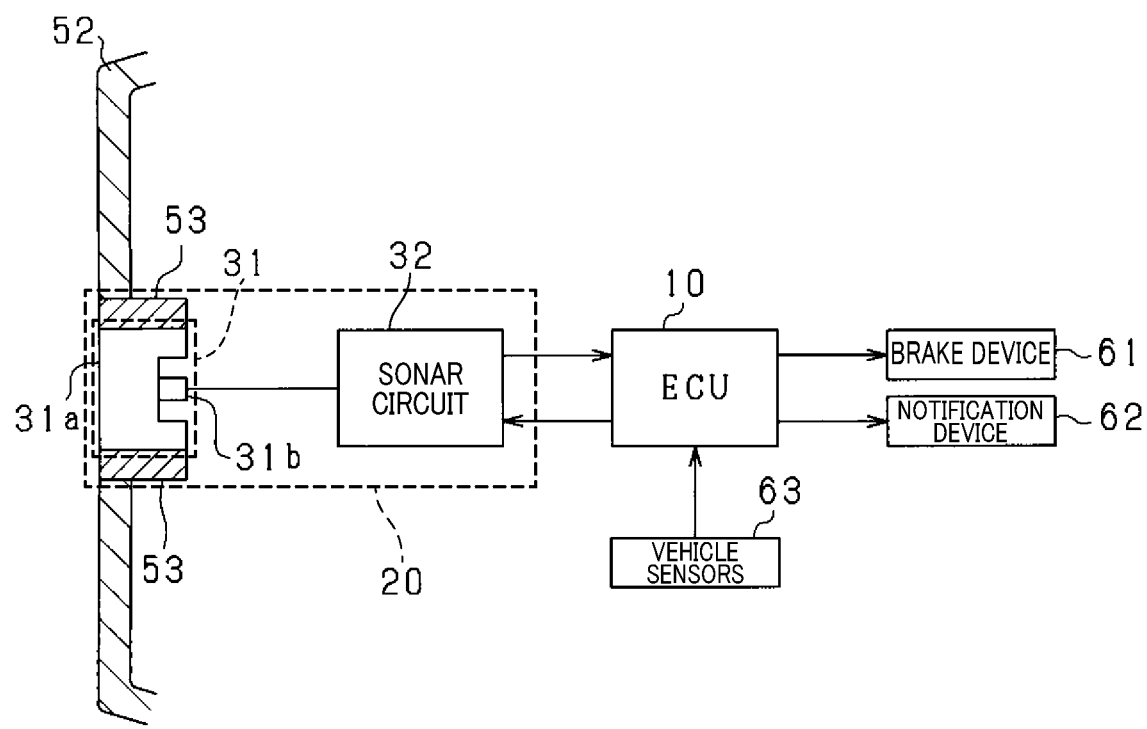
FIG. 2 is a schematic diagram of a vertical cross section at the mounting position of the ultrasonic sensor.

First, with reference to FIGS. 1 and 2, the following describes a vehicle system to which the driving assistance device in accordance with the present embodiment is applied. The driving assistance device in accordance with the present embodiment is constituted by an ECU 10. The ECU 10 is a computer including a CPU, a memory (e.g., ROM and RAM), I/O, and the like. According to the ECU 10, the CPU executes, for example, a program stored in the ROM, so that each function (described later) is achieved.

An ultrasonic sensor 20, vehicle sensors 63, and the like are connected to the ECU 10 as sensors which input various types of detection information to the ECU 10. Furthermore, a brake device 61, a notification device 62, and the like are connected to the ECU 10 as safety devices to which a control command is outputted from the ECU 10.

The ultrasonic sensor 20 transmits ultrasonic waves of, for example, 20 to 100 kHz as transmission waves and receives, as reflected waves, the transmission waves reflected by an object. According to the present embodiment, the ultrasonic sensor 20 is mounted on a bumper 52 in each of front and rear portions of the vehicle such that components are arranged in a vehicle width direction (lateral direction) which is a direction orthogonal to a travelling direction (longitudinal direction) of the own vehicle 50. Specifically, in the front portion of the vehicle, two center sensors 21 and 22 are mounted in respective positions which are symmetrical with respect to a centerline of the vehicle 51 which is a symmetry axis. Furthermore, in the front portion of the vehicle, two corner sensors 23 and 24 are mounted in respective right and left corners. A mounting position of the ultrasonic sensor 20 in the rear portion of the vehicle is similar to that of the ultrasonic sensor 20 in the front portion of the vehicle, and is thus not described here. The number of mounted components and the mounting positions of the ultrasonic sensor 20 described above are examples and are not limited to these.

FIG. 2 shows a schematic diagram of a vertical cross section at the mounting position of the ultrasonic sensor 20. The single ultrasonic sensor 20 includes an oscillator 31 and a sonar circuit 32. The oscillator 31 includes a piezoelectric element 31b and a resonator 31a made of aluminum or the like. The piezoelectric element 31b is built in the resonator 31a. The ultrasonic sensor 20 is embedded in a hole formed on the bumper 52 via a cushion 53 made of a rubber member or the like. One surface of the resonator 31a is exposed from a front surface of the bumper 52 and is a wave transmission surface from which ultrasonic waves are transmitted. The wave transmission surface of the resonator 31a is arranged such that, for example, there is no level difference between the wave transmission surface and the front surface of the bumper 52 and the surfaces are flat. The ultrasonic sensor 20 does not need to be embedded in the bumper 52 and can be embedded in a body or a body exterior component of the own vehicle 50.

Figure 3:
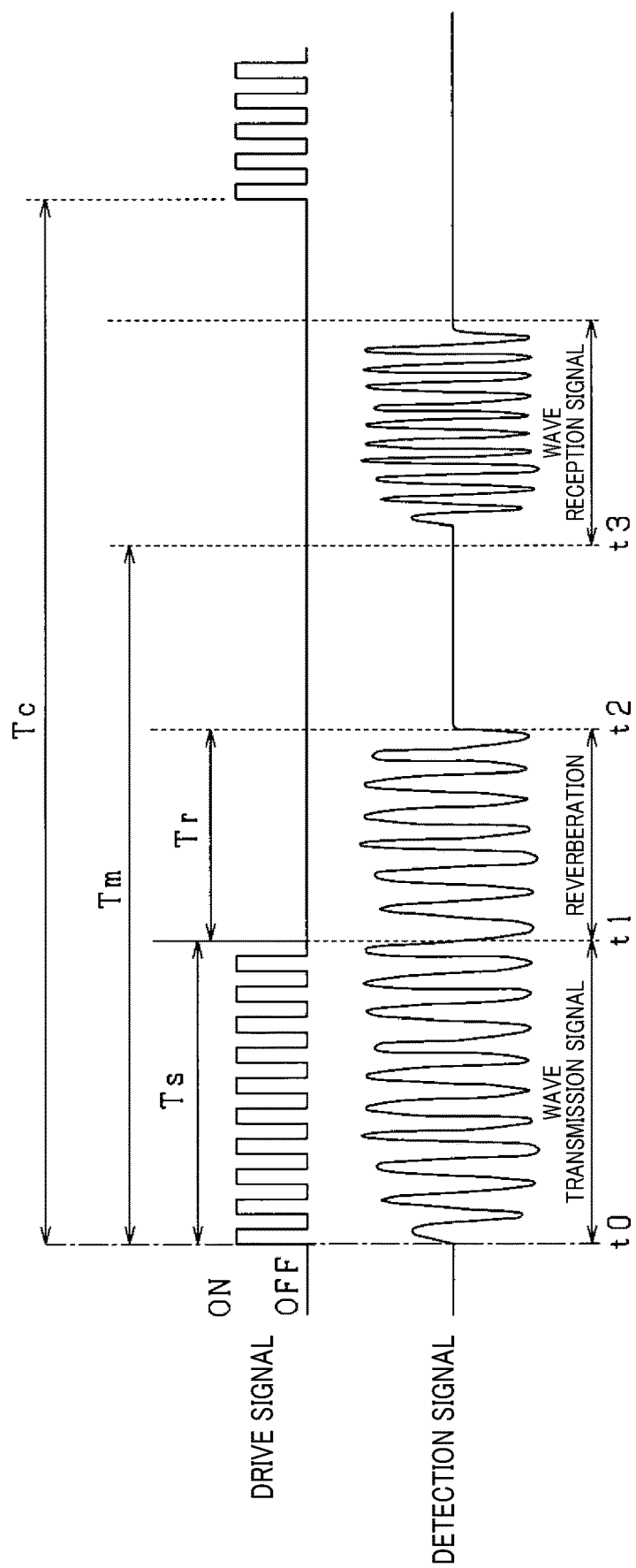
FIG. 3 is a timing diagram showing a drive signal and a detection signal of the ultrasonic sensor.

The sonar circuit 32 is constituted by a drive circuit, a wave reception circuit, a communication circuit, and the like. The drive circuit drives the piezoelectric element 31b. The wave reception circuit receives the ultrasonic waves and detects objects. The communication circuit communicates with the ECU 10. FIG. 3 shows a time chart of a drive signal and a detection signal of the ultrasonic sensor 20. More specifically, FIG. 3 shows a drive signal transmitted from the drive circuit of the sonar circuit 32 to the piezoelectric element 31b and a detection signal of an ultrasonic wave received by the wave reception circuit. As shown in FIG. 3, during a time period from a time point t0 to a time point t1 (during an input time Ts), the sonar circuit 32 inputs a drive signal to the piezoelectric element 31b in accordance with a control command transmitted from the ECU 10. This causes the ultrasonic sensor 20 to transmit ultrasonic waves having a predetermined frequency. That is, the input time Ts which is the time period from the time point t0 to the time point t1 corresponds to a time period during which the piezoelectric element 31b is driven or a time period during which the ultrasonic waves are transmitted. At this time, from the time point t0 to the time point t1, the wave reception circuit receives a wave transmission signal as a detection signal. Furthermore, from the time point t1 to a time point t2, the wave reception circuit receives reverberation as a detection signal. The received reverberation is reverberation of oscillation of the oscillator 31 which occurs in association with the driving of the oscillator 31. The sonar circuit 32 detects a duration Tr and a frequency f of the reverberation. In an example shown in FIG. 3, the reverberation is separated from the wave transmission signal. However, for example, a signal transmitted from the time point t0 to the time point t2 including the wave transmission signal can be reverberation.

Then, when the transmitted ultrasonic wave is reflected by an object, the reflected wave is received by the oscillator 31 at a time point t3. At this time, the wave reception circuit receives a wave reception signal as a detection signal. The sonar circuit 32 amplifies the wave reception signal and performs a filtering process thereof. The sonar circuit 32 compares a voltage level of the amplitude of the processed wave reception signal with a predetermined voltage level which has been set in advance as a threshold. Then, when the amplitude of the wave reception signal is greater than the threshold, the sonar circuit 32 transmits, to the ECU 10, detection information indicating that the object has been detected. The sonar circuit 32 detects (measures) required time for transmission of an ultrasonic wave and reception of a reflected wave. The sonar circuit 32 then calculates a distance (relative distance) from the own vehicle 50 to the object by converting the detected required time and transmits the calculated distance to the ECU 10. The distance from the own vehicle 50 to the object can be calculated by the ECU 10. In such a case, the sonar circuit 32 transmits, to the ECU 10, the required time for the transmission and reception of ultrasonic waves. Thus, the ECU 10 can calculate a distance to the object by converting the received required time. With regard to various arithmetic processes (described later), the present embodiment deals with an example in which one of the sonar circuit 32 and the ECU 10 performs the processes, but the configuration is not limited to this. The various arithmetic processes can be performed by either one of the sonar circuit 32 and the ECU 10.

According to the above mechanism for transmitting and receiving an ultrasonic wave, reverberation is erroneously recognized as a wave reception signal during a time period in which the reverberation continues. Accordingly, during the time period in which reverberation continues, there is a possibility that, on the basis of the wave reception signal, an object is erroneously detected or a distance to the object is erroneously calculated. Thus, the sonar circuit 32 detects an object and calculates a distance to the object on the basis of a wave reception signal received after a predetermined mask time Tm has elapsed from the transmission of ultrasonic waves from the oscillator 31. That is, the sonar circuit 32 starts a process for detecting an object and a process for calculating a distance to the object after the predetermined mask time Tm has elapsed from the time point t0 at which the transmission of the drive signal starts. The mask time Tm is set to be longer than a time period from start of the transmission of ultrasonic waves to end of the reverberation (Tm>Ts+Tr) in normal time when the ultrasonic sensor 20 is operating normally. The sonar circuit 32 transmits an ultrasonic wave and receives a reflected wave at intervals of a predetermined wave transmission period Tc. Furthermore, the sonar circuit 32 detects the duration Tr and the frequency f of the reverberation and transmits the detected duration Tr and frequency f to the ECU 10. The sonar circuit 32 receives from the ECU 10 various parameters such as an amplification factor of the wave reception signal, the voltage level of the threshold, the mask time Tm, and the wave transmission period Tc. The sonar circuit 32 does not receive from the ECU 10 all parameters necessary for control regarding the transmission and reception of ultrasonic waves. The sonar circuit 32 has a parameter which is not received from the ECU 10.

The vehicle sensors 63 are various sensors each of which detects a state of the own vehicle 50. Specifically, the vehicle sensors 63 are a vehicle speed sensor, a shift position sensor, a steering angle sensor, and the like. The vehicle speed sensor detects a vehicle speed at which the own vehicle 50 travels. The shift position sensor detects each position of a shift lever (shift state) in the own vehicle 50. The steering angle sensor detects a steering angle provided by an operation of a steering wheel or the like in the own vehicle 50.

The brake device 61 is a braking device which performs braking of the own vehicle 50. When the ECU 10 determines that there is a possibility that the own vehicle 50 may collide with an object and it is necessary perform driving assistance control for activating the brake device 61, the ECU 10 transmits, to the brake device 61, a control command instructing the brake device 61 to be activated. This causes the brake device 61 to be activated. Specifically, on the basis of the control command transmitted from the ECU 10, the brake device 61 increases a braking force generated by a brake operation performed by a driver or performs automatic braking regardless of whether the driver has performed a brake operation. As the safety device, a drive control device which controls a driving force of the own vehicle 50 can be further connected to the ECU 10. In such a case, when the ECU 10 determines that there is a possibility that the own vehicle 50 may collide with an object and it is necessary perform driving assistance control for reducing a driving force, the ECU 10 transmits, to the drive control device, a control command instructing the drive control device to be activated. This causes the drive control device to reduce the driving force of the own vehicle 50.

The notification device 62 is a loudspeaker, a display, a buzzer, or the like provided in a cabin of the own vehicle 50. When the ECU 10 determines that there is a possibility that the own vehicle 50 may collide with an object and it is necessary perform driving assistance control for activating the notification device 62, the ECU 10 transmits, to the notification device 62, a control command instructing the notification device 62 to be activated. This causes the notification device 62 to be activated. Specifically, on the basis of the control command transmitted from the ECU 10, the notification device 62 notifies the driver of a collision risk by outputting an alarm sound, alert sound, alarm message, or the like. It is only necessary that at least one of the brake device 61 and the notification device 62 is connected to the ECU 10 as the safety device.

By using a result of the detection performed by the ultrasonic sensor 20, the ECU 10 performs the driving assistance control of the own vehicle 50 and makes a determination (determination of abnormality) of whether an abnormality is present in the driving assistance control. The driving assistance control is a process for activating the safety device when detection information on detection of an object and a distance to the object are acquired and there is a possibility (there is a high risk) that the own vehicle 50 collides with the object. Specifically, the driving assistance control causes the safety device to be activated when, for example, in a place such as a parking lot where the vehicle speed becomes low, an object which is located within several meters from the own vehicle 50 is detected and there is a possibility that the own vehicle 50 may collide with the object. The determination of whether an abnormality is present in the driving assistance control is a process for determining a presence or absence of an abnormality (sensor abnormality) in the ultrasonic sensor 20 used for the driving assistance control or for determining an abnormality such as a memory error (bit error).

The ultrasonic sensor 20 is embedded in the bumper 52. Thus, when rainwater or the like flows (for convenience, hereinafter referred to as "flowing water is present") on the surface of the oscillator 31 which is the wave transmission surface, consecutive drops of the rainwater or the like flow in a region including the surface of the oscillator 31 and the bumper 52 around the surface. In such a case, oscillation of the oscillator 31 is transmitted to the rainwater or the like flowing in the region including the surface of the oscillator 31 and the bumper 52 around the surface. Thus, when flowing water is present on the surface of the oscillator 31, due to spread of the oscillation, an oscillation characteristic of the reverberation changes as compared with a reference characteristic when no rainwater or the like is flowing (for convenience, hereinafter referred to as "no flowing water is present") on the surface of the oscillator 31.

Figure 4:
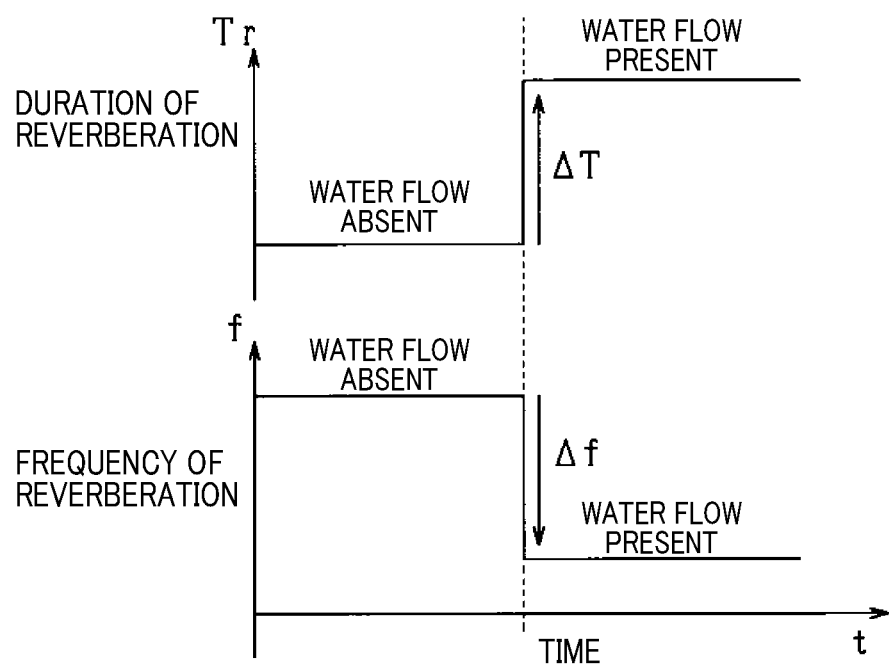
FIG. 4 is a timing diagram showing a duration and a frequency of reverberation.

FIG. 4 shows a time chart of a duration and a frequency of reverberation. More specifically, FIG. 4 shows a change over time in the duration Tr of the reverberation when ultrasonic waves are transmitted at intervals of the predetermined wave transmission period Tc. FIG. 4 further shows a change over time in the frequency f of the reverberation corresponding to the change over time in the duration Tr. As shown in FIG. 4, when a state where no flowing water is present changes to a state where flowing water is present, the duration Tr of the reverberation becomes longer and the frequency f of the reverberation becomes lower. At this time, the duration Tr of the reverberation greatly changes to become longer and the frequency f of the reverberation greatly changes to become lower. Thus, when the state where no flowing water is present changes to the state where flowing water is present, an oscillation characteristic having abrupt variation is presented, in which the duration Tr and the frequency f of the reverberation simultaneously greatly change (an amount of change $\Delta T$ in the duration Tr and an amount of change $\Delta f$ in the frequency f increase).

Values of the duration Tr and the frequency f of the reverberation when flowing water is present may be within a range of values of the duration Tr and the frequency f when no flowing water is present. However, an abrupt change in oscillation characteristic in which the duration Tr and the frequency f of the reverberation simultaneously greatly change is peculiar to a case where flowing water is present. For example, when no flowing water is present and no solid object is attached to the surface of the oscillator 31, a change in oscillation characteristic is relatively small. When a solid object such as snow is attached to the surface of the oscillator 31, the solid object is gradually attached to the surface and a state of the region including the surface of the oscillator 31 and the bumper 52 around the surface relatively gradually changes. Accordingly, when the solid object such as snow is attached to the surface, the oscillation characteristic also relatively gradually changes. Meanwhile, when flowing water is present on the surface of the oscillator 31, the state of the region including the surface of the oscillator 31 and the bumper 52 around the surface abruptly changes. Accordingly, when flowing water is present, the oscillation characteristic also abruptly changes. Thus, when flowing water is present on the surface of the oscillator 31, a specific change occurs in the oscillation characteristic of the reverberation. Furthermore, when flowing water is present on the surface of the oscillator 31, an oscillation characteristic of an ultrasonic wave changes, and thus an intensity of an ultrasonic wave which is propagated in atmosphere is reduced as compared with when no flowing water is present.

When flowing water is present on the surface of the oscillator 31, due to the change in oscillation characteristic of the reverberation and the decrease in intensity of the transmission waves in atmosphere, the erroneous detection of short distance or a decrease in object detectability occurs. Accordingly, when flowing water is present on the surface of the oscillator 31 and the driving assistance control or the determination of abnormality in the driving assistance control is performed in an execution mode similar to that is used when no flowing water is present, a phenomenon as below may occur. For example, the safety device is erroneously activated (hereinafter referred to as "erroneous activation of the safety device"), determination of abnormality is erroneously made (hereinafter referred to as "erroneous determination of abnormality"), or an opportunity for driving assistance is reduced (hereinafter referred to as "decrease in opportunity for driving assistance"). Thus, when flowing water is present on the surface of the oscillator 31, the ECU 10 which is the driving assistance device in accordance with the present embodiment changes the execution mode of the driving assistance control and the determination of abnormality in the driving assistance control.

Figure 5:
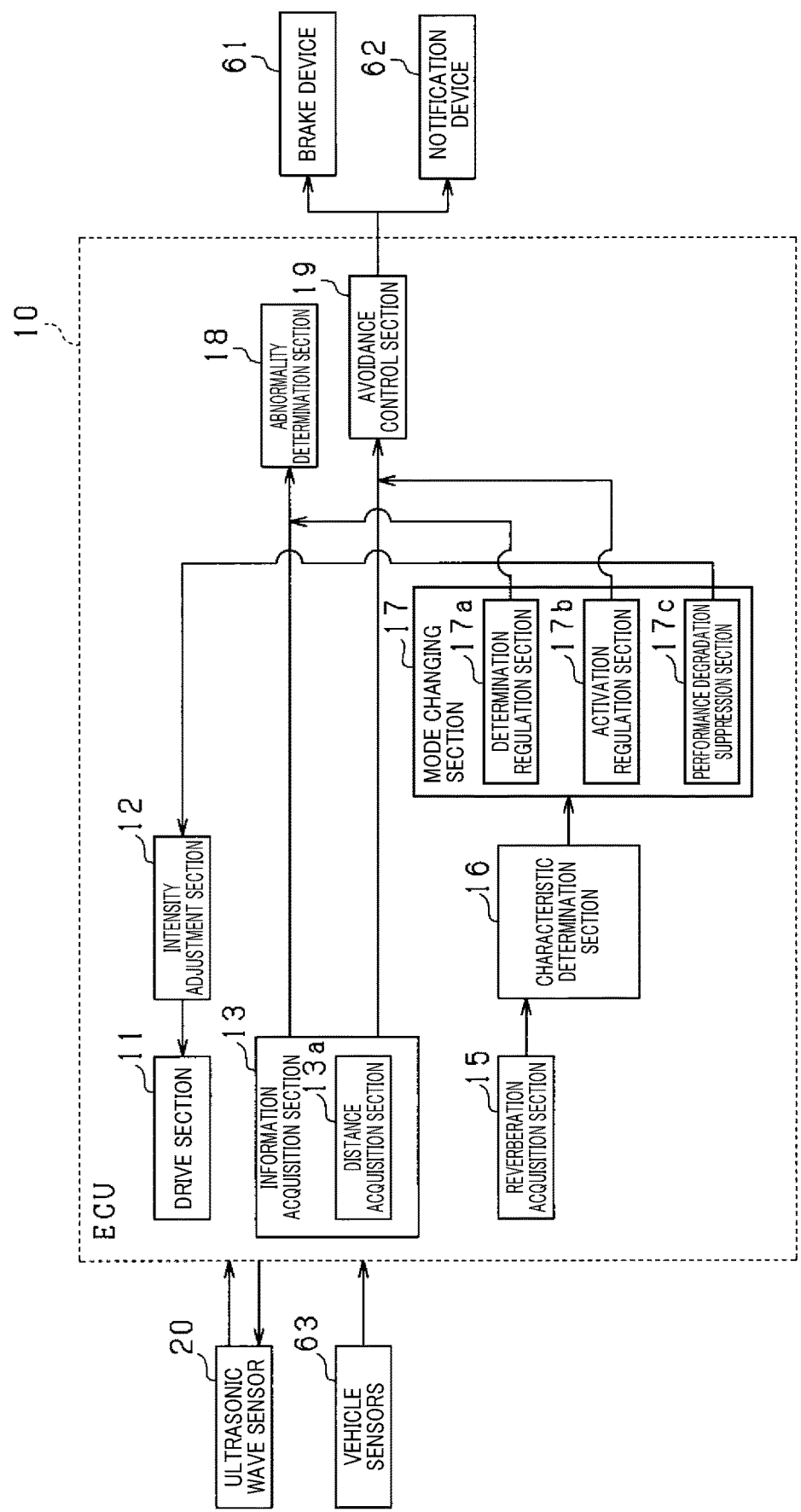
FIG. 5 is a block diagram showing a configuration of a driving assistance device.

With reference to FIG. 5, the following description will discuss functions of the ECU 10 in accordance with the present embodiment. The ECU 10 includes a drive section 11, an intensity adjustment section 12, an information acquisition section 13, a reverberation acquisition section 15, a characteristic determination section 16, a mode changing section 17, an abnormality determination section 18, an avoidance control section 19, and the like. According to the ECU 10, for example, the CPU executes a predetermined program, so that the above functions are achieved.

The drive section 11 drives the oscillator 31 of the ultrasonic sensor 20 so that ultrasonic waves are transmitted from the oscillator 31. Specifically, the drive section 11 drives the oscillator 31 by transmitting a drive command to the sonar circuit 32 of the ultrasonic sensor 20. The intensity adjustment section 12 adjusts an intensity of oscillation (intensity of output) of the oscillator 31. Specifically, the intensity adjustment section 12 adjusts the intensity of the oscillation by setting, for the drive section 11, a value indicating the intensity of the oscillation when the oscillator 31 is driven. On the basis of the set value (adjusted value) provided by the intensity adjustment section 12, the drive section 11 transmits a drive command to the sonar circuit 32 so that the oscillator 31 is driven at the set (adjusted) intensity. Thus, according to the ultrasonic sensor 20, the oscillator 31 transmits an ultrasonic wave whose oscillation is at the intensity set by the intensity adjustment section 12.

The information acquisition section 13 acquires detection information on detection of an object at intervals of the predetermined wave transmission period Tc. The detection information is transmitted from the ultrasonic sensor 20 to the ECU 10 as follows. According to the ultrasonic sensor 20, the sonar circuit 32 detects an object on the basis of reception of a plurality of reflected waves of an ultrasonic wave transmitted from the oscillator 31. A result of the detection is transmitted to the ECU 10. Furthermore, the information acquisition section 13 has a function of a distance acquisition section 13a. The distance acquisition section 13a acquires information on a distance from the own vehicle 50 to the object (hereinafter referred to as "distance information"). The distance information is transmitted from the ultrasonic sensor 20 to the ECU 10 as below. According to the ultrasonic sensor 20, on the basis of reception of a reflected wave of an ultrasonic wave transmitted from the oscillator 31, the sonar circuit 32 detects the required time for the transmission and reception of ultrasonic waves. According to the ultrasonic sensor 20, the distance to the object is calculated by converting the detected required time. A result of the calculation is transmitted to the ECU 10.

The reverberation acquisition section 15 acquires information on reverberation (hereinafter referred to as "reverberation information"). The reverberation information includes the duration Tr and the frequency f of the reverberation. The duration Tr and the frequency f are transmitted from the ultrasonic sensor 20 to the ECU 10 as below. According to the ultrasonic sensor 20, the sonar circuit 32 detects the duration Tr and the frequency f of the reverberation in association with the driving of the oscillator 31. A result of the detection is transmitted to the ECU 10.

The characteristic determination section 16 determines whether or not the oscillation characteristic of the reverberation has changed. On the basis of the duration Tr and the frequency f which are the reverberation information acquired by the reverberation acquisition section 15, the characteristic determination section 16 determines whether or not the oscillation characteristic of the reverberation has changed. When making the determination, the characteristic determination section 16 determines that the oscillation characteristic of the reverberation has changed, when the duration Tr has changed to become longer (increase) and the frequency f has changed to become lower (decrease).

Specifically, on the basis of the amount of change $\Delta T$ in the duration Tr and the amount of change $\Delta f$ in the frequency f, the characteristic determination section 16 determines whether or not the oscillation characteristic of the reverberation has changed. Note that the "amount of change" means an amount of change per unit time and corresponds to, for example, an amount of increase/decrease to a present value (current value) from a past value (for convenience, hereinafter referred to as "previous value") recorded a predetermined time earlier. The characteristic determination section 16 determines that the oscillation characteristic of the reverberation has changed, on the condition that the amounts of change ΔT and Δf in the respective duration Tr and frequency f exceed respective predetermined values. That is, when the amount of change ΔT which is the amount of increase from the previous value to the current value in the duration Tr exceeds a predetermined value ΔTh and the amount of change Δf which is the amount of decrease from the previous value to the current value in the frequency f exceeds a predetermined value Δfh, the characteristic determination section 16 determines that the oscillation characteristic of the reverberation has changed. Thus, according to the ECU 10, it is determined that the oscillation characteristic of the reverberation has changed due to a fact that flowing water is present on the surface of the oscillator 31.

The abnormality determination section 18 determines whether an abnormality is present in the driving assistance control. On the basis of the distance from the own vehicle 50 to the object, which is the distance information acquired by the distance acquisition section 13a, and a movement state of the own vehicle 50 at a current time point, the abnormality determination section 18 determines whether an abnormality is present in the driving assistance control. Specifically, the abnormality determination section 18 determines that an abnormality has occurred in the driving assistance control, when the own vehicle 50 has moved more than a second distance while the distance from the own vehicle 50 to the object is less than a first distance. In general, when the distance from the own vehicle 50 to the object becomes less than the first distance, in order to avoid a collision, the driver drives so that the distance to the object is increased. Alternatively, in such a case, the brake device 61 is activated by the driving assistance control and the own vehicle 50 is stopped. Accordingly, the own vehicle 50 normally does not move more than the second distance while the distance to the object is less than the first distance. Thus, in such a case, it is determined that the ultrasonic sensor 20 is abnormal and an abnormality has occurred in the driving assistance control. For example, Patent Literature JP 2015-49665 A describes the determination of abnormality in the driving assistance control.

The avoidance control section 19 controls activation of the safety device in order to avoid a collision of the own vehicle 50 with an object or reduce damage from the collision. On the basis of the distance from the own vehicle 50 to the object, which is the distance information acquired by the distance acquisition section 13a, the avoidance control section 19 activates the brake device 61 and the notification device 62 each of which is the safety device. Specifically, the avoidance control section 19 activates the safety device when the distance acquisition section 13a acquires, for a single object, the distance within a predetermined range for the predetermined number of times.

The mode changing section 17 changes the execution mode of the driving assistance control and the determination of abnormality in the driving assistance control, when flowing water is present on the surface of the oscillator 31. On the basis of a result of the determination (result of the determination of whether the oscillation characteristic of the reverberation has changed) made by the characteristic determination section 16, the mode changing section 17 changes the execution mode of the driving assistance control and the determination of abnormality in the driving assistance control. The mode changing section 17 has functions of a determination regulation section 17a, an activation regulation section 17b, and a performance degradation suppression section 17c.

The determination regulation section 17a changes the execution mode of the determination of abnormality in the driving assistance control so that the erroneous determination of abnormality in the driving assistance control is suppressed. When flowing water is present on the surface of the oscillator 31, the duration Tr of the reverberation becomes longer. Accordingly, when flowing water is present, the reverberation may be erroneously detected as a reflected wave from an object located at a short distance. Furthermore, when the brake device 61 is activated as the safety device, it is necessary to detect an object which is located at a relatively long distance (e.g., a distance from the own vehicle 50 is several meters). Thus, when the brake device 61 is activated, output of the ultrasonic sensor 20 is increased as compared with when only the notification device 62 is activated. Accordingly, in particular, when the brake device 61 is activated, the duration Tr of the reverberation becomes longer, and thus the erroneous detection of short distance is more likely to occur.

When the erroneous detection of short distance occurs, the own vehicle 50 continues to move while the distance from the own vehicle 50 to the object is short. Accordingly, even though the erroneous detection has merely temporarily occurred due to an influence of the flowing water, it is determined that a sensor abnormality has occurred in the ultrasonic sensor 20. Consequently, in a final abnormality determination process, it may be erroneously determined that an abnormality has occurred in the driving assistance control. Thus, the determination regulation section 17a restricts the determination, in the abnormality determination process performed by the abnormality determination section 18, that an abnormality has occurred.

On the basis of the result of the determination made by the characteristic determination section 16, the determination regulation section 17a restricts the determination, in the abnormality determination process performed by the abnormality determination section 18, that an abnormality has occurred. Specifically, when the characteristic determination section 16 determines that the oscillation characteristic of the reverberation has changed, the determination regulation section 17a stops the abnormality determination process performed by the abnormality determination section 18. This allows the ECU 10 (driving assistance device) to suppress the erroneous determination that the ultrasonic sensor 20 is abnormal, even when flowing water is present on the surface of the oscillator 31.

Alternatively, when the characteristic determination section 16 determines that the oscillation characteristic of the reverberation has changed, the determination regulation section 17a performs at least one of shortening of the first distance (shortening of a reference distance from the own vehicle 50 to the object) and extension of the second distance (extension of a reference movement distance of the own vehicle 50). Thus, according to the ECU 10, even when the erroneous detection of short distance occurs, it becomes less likely to be determined that the ultrasonic sensor 20 is abnormal and thus the erroneous determination of abnormality is suppressed.

The activation regulation section 17b changes the execution mode of the driving assistance control so that the erroneous activation of the safety device is suppressed. As described above, when flowing water is present on the surface of the oscillator 31, the erroneous detection of short distance may occur due to the flowing water. Accordingly, when flowing water is present, the safety device may be erroneously activated due to the erroneous detection of short distance. Thus, the activation regulation section 17b restricts the activation of the safety device (causes the safety device to be less likely to be activated) in an avoidance control process performed by the avoidance control section 19.

On the basis of the result of the determination made by the characteristic determination section 16, the activation regulation section 17b restricts the activation of the safety device in the avoidance control process performed by the avoidance control section 19. Specifically, when the characteristic determination section 16 determines that the oscillation characteristic of the reverberation has changed, the activation regulation section 17b extends the mask time Tm for the ultrasonic sensor 20. The activation regulation section 17b then transmits the extended mask time Tm to the sonar circuit 32. As described above, the ultrasonic sensor 20 starts the process for detecting an object and the process for calculating a distance to the object after the predetermined mask time Tm has elapsed from the time point t0 at which the transmission of the drive signal starts. Accordingly, the distance to the object is not calculated from a reflected wave returning during the mask time Tm. Thus, as the mask time Tm becomes longer, the distance to the object to be calculated becomes longer. Thus, according to the ECU 10 (driving assistance device), the erroneous detection of short distance occurring due to the flowing water is suppressed by extending the mask time Tm. This restricts the activation of the safety device (causes the safety device to be less likely to be activated).

Alternatively, when the characteristic determination section 16 determines that the oscillation characteristic of the reverberation has changed, with regard to a condition under which the safety device is activated by the avoidance control section 19, the activation regulation section 17b changes the condition so that the safety device becomes less likely to be activated. Specifically, the activation regulation section 17b increases the reference number of acquisitions which is a criterion for the number of acquisitions of the distance for a single object and is one of conditions for activating the safety device. Thus, according to the ECU 10, by increasing the reference number of acquisitions, a criterion for the condition for activating the safety device is raised. This restricts the activation of the safety device (causes the safety device to be less likely to be activated). The activation regulation section 17b can perform both of the extension of the mask time Tm and the increase in the reference number of acquisitions of the distance.

The performance degradation suppression section 17c changes the execution mode of the driving assistance control so that the decrease in object detectability is suppressed. As described above, when flowing water is present on the surface of the oscillator 31, the duration Tr of the reverberation becomes longer. Accordingly, when flowing water is present, a reflected wave from an object located at a short distance overlaps with the reverberation and thus cannot be distinguished. When flowing water is present, an intensity of a transmission wave in atmosphere is reduced and an intensity of a reflected wave also tends to be reduced. Accordingly, when flowing water is present, it becomes difficult to detect a reflected wave from an object located at a short distance and thus object detectability of the ultrasonic sensor 20 is reduced. Accordingly, when flowing water is present, there is a possibility that even though an object is located at a short distance, the object cannot be detected and thus the driving assistance control is not performed. In view of this point, it is possible to take an action of constantly maintaining high object detectability. When such an action is taken, however, an object which does not need to be detected (e.g., object or the like which is located at a long distance) is also detected or a reflected wave from the object located at a long distance interferes with a transmission wave. Thus, the performance degradation suppression section 17c suppresses the decrease in object detectability of the ultrasonic sensor 20.

On the basis of the result of the determination made by the characteristic determination section 16, the performance degradation suppression section 17c suppresses the decrease in object detectability of the ultrasonic sensor 20. When the characteristic determination section 16 determines that the oscillation characteristic of the reverberation has changed, the performance degradation suppression section 17c performs a process as below. Specifically, the performance degradation suppression section 17c makes a correction for amplification of an amplitude of a wave reception signal by increasing an amplification factor by with the wave reception signal is amplified by the sonar circuit 32. Alternatively, the performance degradation suppression section 17c lowers the threshold (reference value to be compared with the amplitude of the wave reception signal when the object is detected) which is a criterion on which an object is detected by the sonar circuit 32. The performance degradation suppression section 17c then transmits the increased amplification factor or the lowered threshold to the sonar circuit 32. This allows the ECU 10 (driving assistance device) to suppress the decrease in object detectability. Consequently, the decrease in opportunity for driving assistance control is suppressed.

Alternatively, when the characteristic determination section 16 determines that the oscillation characteristic of the reverberation has changed, the performance degradation suppression section 17c increases output of transmission waves by causing the intensity adjustment section 12 to increase an intensity of oscillation of the oscillator 31. This allows the ECU 10 to suppress the decrease in object detectability. Consequently, the decrease in opportunity for driving assistance control is suppressed. The performance degradation suppression section 17c can perform both of the correction for amplification of the amplitude or the lowering of the threshold and the increase in intensity of the oscillation.

Instead of performing the correction for amplification of the amplitude, the lowering of the threshold, and the increase in intensity of the oscillation, the performance degradation suppression section 17c can perform a process as below. When the characteristic determination section 16 determines that the oscillation characteristic of the reverberation has changed, the performance degradation suppression section 17c shortens the wave transmission period Tc for the ultrasonic wave. The performance degradation suppression section 17c can then transmit the shortened wave transmission period Tc to the sonar circuit 32. As described above, when flowing water is present on the surface of the oscillator 31, an intensity of a transmission wave is reduced, and thus a reflected wave is returned only from an object which is located at a relatively short distance. Accordingly, when flowing water is present, even when the wave transmission period Tc for the ultrasonic wave is shortened, there is no possibility that a transmission wave interferes with a reflected wave. Even an object which has not been able to be detected at a current time point may become detectable when the own vehicle 50 approaches the object and thus an intensity of a reflected wave from the object is increased. In such a case, the shortening of the wave transmission period Tc makes it possible to detect an object at an earlier time point and increase the number of detections of an object. Thus, according to the ECU 10 (driving assistance device), the shortening of the wave transmission period Tc increases a speed for detection of an object and the number of detections of an object, and this suppresses the decrease in object detectability. Consequently, the decrease in opportunity for driving assistance control is suppressed. Furthermore, the mode changing section 17 can perform, in combination, the increase in the reference number of acquisitions of the distance for a single object by the activation regulation section 17b and the shortening of the wave transmission period Tc by the performance degradation suppression section 17c. This allows the ECU 10 to suppress the decrease in object detectability by increasing the number of acquisitions of the distance so that accuracy for recognizing an object is increased and by shortening the wave transmission period Tc for the ultrasonic wave.

When the characteristic determination section 16 determines that the oscillation characteristic of the reverberation has changed, the determination regulation section 17a, the activation regulation section 17b, and the performance degradation suppression section 17c each make the above change of the execution mode for a predetermined time period after the characteristic determination section 16 makes the determination. That is, the predetermined time period corresponds to a time period during which the change is made by the mode changing section 17.

A given time period can be set in advance as the above predetermined time period. Alternatively, a time period during which a change in oscillation characteristic of the reverberation continues (hereinafter referred to as "duration of change") can be the predetermined time period. The duration of change in oscillation characteristic of the reverberation can be a time period as below. At a time point at which it is determined that the oscillation characteristic of the reverberation has changed, the mode changing section 17 stores, in a predetermined storage area, the duration Tr and the frequency f before the change. The mode changing section 17 then sets, as the duration of change, a time period during which the amount of change ΔT from the stored duration Tr continues to exceed the predetermined value ΔTh and the amount of change Δf from the stored frequency f continues to exceed the predetermined value Δfh. Alternatively, the predetermined time period can be a time period during which a condition as below continues. For example, assuming that rain continues to fall, the predetermined time period can be a time period for a single trip (time period for movement in a given section). The driving assistance control in which the ultrasonic sensor 20 is used as the clearance sonar is normally performed while the vehicle is traveling at low speed or is being reversed. Accordingly, the predetermined time period can be a time period during which a vehicle speed not more than a predetermined speed continues or a time period during which a shift position in reverse continues.

Next, with reference to FIG. 6, the following description will discuss a procedure for changing the execution mode of the determination of abnormality in the driving assistance control and the driving assistance control in accordance with the present embodiment. This process is performed by the ECU 10 (driving assistance device) at intervals of a predetermined execution period.

First, according to the ECU 10, the drive section 11 drives the oscillator 31 of the ultrasonic sensor 20 on the basis of the wave transmission period Tc for the ultrasonic wave (S1). At this time, on the basis of the set value (adjusted value) provided by the intensity adjustment section 12, the drive section 11 transmits a drive command to the sonar circuit 32 so that the oscillator 31 is driven at the set (adjusted) intensity. Subsequently, according to the ECU 10, the reverberation acquisition section 15 acquires the duration Tr of the reverberation occurring in association with the oscillation of the oscillator 31 from the sonar circuit 32 of the ultrasonic sensor 20 (S2). Subsequently, according to the ECU 10, the reverberation acquisition section 15 acquires the frequency f of the reverberation from the sonar circuit 32 (S3).

Subsequently, according to the ECU 10, the characteristic determination section 16 determines whether the amount of change ΔT per unit time in the duration Tr of the reverberation is greater than the predetermined value ΔTh (S4). Specifically, the characteristic determination section 16 calculates the amount of change ΔT from the duration Tr (previous value) acquired in the previous process to the duration Tr (current value) acquired in the current process. The amount of change ΔT is calculated so that the amount of change ΔT is a positive value when the duration Tr acquired in the current process has increased from the duration Tr acquired in the previous process. That is, in the amount of change ΔT in the duration Tr of the reverberation, the amount of increase is indicated by a positive value and the amount of decrease is indicated by a negative value. The characteristic determination section 16 then compares the calculated amount of change ΔT (absolute value) with the predetermined value ΔTh which is a determination criterion. Then, according to the ECU 10, when the characteristic determination section 16 determines that the amount of change ΔT in the duration Tr of the reverberation is not more than the predetermined value ΔTh (No at S4), the process ends.

Meanwhile, according to the ECU 10, when the characteristic determination section 16 determines that the amount of change ΔT in the duration Tr of the reverberation is greater than the predetermined value ΔTh (Yes at S4), the characteristic determination section 16 determines whether the amount of change Δf per unit time in the frequency f of the reverberation is greater than the predetermined value Δfh (S5). Specifically, the characteristic determination section 16 calculates the amount of change Δf from the frequency f (previous value) acquired in the previous process to the frequency f (current value) acquired in the current process. The amount of change Δf is calculated so that the amount of change Δf is a positive value when the frequency f acquired in the current process has decreased from the frequency f acquired in the previous process. That is, in the amount of change Δf in the frequency f of the reverberation, the amount of decrease is indicated by a positive value and the amount of increase is indicated by a negative value. The characteristic determination section 16 then compares the calculated amount of change Δf (absolute value) with the predetermined value Δfh which is a determination criterion. Then, according to the ECU 10, when the characteristic determination section 16 determines that the amount of change Δf in the frequency f of the reverberation is not more than the predetermined value Δfh (No at S5), the process ends.

Meanwhile, according to the ECU 10, when the characteristic determination section 16 determines that the amount of change Δf in the frequency f of the reverberation is greater than the predetermined value Δfh (Yes at S5), the characteristic determination section 16 determines that a change in characteristic of the reverberation due to the flowing water has occurred. That is, according to the ECU 10, it is determined that the oscillation characteristic of the reverberation has changed, on condition that the amounts of change ΔT and Δf in the respective duration Tr and frequency f of the reverberation exceed the respective predetermined values ΔTh and Δfh. Then, according to the ECU 10, when it is determined that the oscillation characteristic of the reverberation has changed, the mode changing section 17 suppresses the erroneous determination of abnormality in the driving assistance control as described above (S6). That is, according to the ECU 10, the determination regulation section 17a restricts the determination that an abnormality has occurred in the driving assistance control, and changes the execution mode of the determination of abnormality in the driving assistance control.

Subsequently, according to the ECU 10, the mode changing section 17 suppresses the erroneous activation of the safety device in the driving assistance control as described above (S7). That is, according to the ECU 10, the activation regulation section 17b restricts the activation of the safety device (causes the safety device to be less likely to be activated), and changes the execution mode of the driving assistance control for activating the safety device.

Subsequently, according to the ECU 10, the mode changing section 17 suppresses the decrease in object detectability as described above (S8). That is, according to the ECU 10, the performance degradation suppression section 17c suppresses the decrease in object detectability, and changes the execution mode of the driving assistance control for driving the ultrasonic sensor 20. In this manner, according to the ECU 10, the process ends. According to the ECU 10, when the changing processes in the steps S6 to S8 are not performed (when a negative determination is made in the determination process in the steps S4 or S5), control returns to the process in the step S1 after the predetermined execution period has elapsed and the process is repeated. Meanwhile, according to the ECU 10, when the changing processes in the steps S6 to S8 are performed (when an affirmative determination is made in the determination processes in the steps S4 and S5), control returns to the process in the step S1 after the predetermined execution period has elapsed. Instead of the determination processes in the steps S4 and S5, the ECU 10 then determines whether the predetermined time period has elapsed. Then, according to the ECU 10, when the predetermined time period has not elapsed, the changing processes in the steps S6 to S8 are performed. When the predetermined time period has elapsed, the changing processes in the steps S6 to S8 are not performed and the process ends.

As described above, according to the driving assistance device (ECU 10) in accordance with the present embodiment, the aforementioned configuration yields effects below.

According to the driving assistance device in accordance with the present embodiment, the duration Tr and the frequency f of the reverberation occurring in association with the driving of the oscillator 31 of the ultrasonic sensor 20 are acquired. According to the driving assistance device, on the basis of the acquired duration Tr and frequency f of the reverberation, it is determined whether the oscillation characteristic of the reverberation has changed. According to the driving assistance device, on the basis of a result of the determination of the oscillation characteristic of the reverberation, at least one execution mode of the driving assistance control and the determination of abnormality for determining whether an abnormality is present in the driving assistance control is changed. This allows the driving assistance device in accordance with the present embodiment to provide appropriate driving assistance when a fluid is flowing (when flowing water is present) on the surface of the oscillator 31.

According to the driving assistance device in accordance with the present embodiment, a change in oscillation characteristic of the reverberation is determined when the duration Tr of the reverberation has changed to be longer (increase) and the frequency f of the reverberation has changed to be lower (decrease). This allows the driving assistance device in accordance with the present embodiment to determine, with high accuracy, an occurrence of a change in oscillation characteristic of the reverberation, when flowing water is present on the surface of the oscillator 31.

The abrupt change in oscillation characteristic in which the duration Tr and the frequency f of the reverberation simultaneously greatly change is a particular change which is seen when flowing water is present on the surface of the oscillator 31. Thus, according to the driving assistance device in accordance with the present embodiment, an occurrence of a change in oscillation characteristic of the reverberation is determined on the basis of a determination condition as below. Specifically, according to the driving assistance device, the determination condition is that the amount of change ΔT from the previous value to the current value in the duration Tr of the reverberation exceeds the predetermined value ΔTh and the amount of change Δf from the previous value to the current value in the frequency f of the reverberation exceeds the predetermined value Δfh. This allows the driving assistance device in accordance with the present embodiment to determine, with high accuracy, an occurrence of a change in oscillation characteristic of the reverberation, when flowing water is present on the surface of the oscillator 31.

When flowing water is present on the surface of the oscillator 31, there is a possibility that the erroneous detection of short distance occurs due to the flowing water and even though the ultrasonic sensor 20 is not abnormal, it is erroneously determined that an abnormality has occurred in the driving assistance control. Meanwhile, according to the driving assistance device in accordance with the present embodiment, when it is determined that the oscillation characteristic of the reverberation has changed (when the erroneous detection of short distance due to the flowing water may occur), the determination that an abnormality has occurred is restricted. This allows the driving assistance device in accordance with the present embodiment to suppress the erroneous determination that an abnormality has occurred in the driving assistance control even though the abnormality has not occurred.

According to the driving assistance device in accordance with the present embodiment, when it is determined that the oscillation characteristic of the reverberation has changed, the determination of abnormality in the driving assistance control is stopped. This allows the driving assistance device in accordance with the present embodiment to reliably suppress the erroneous determination that an abnormality has occurred in the driving assistance control even though the abnormality has not occurred.

According to the driving assistance device in accordance with the present embodiment, the first distance (reference distance from the own vehicle 50 to the object) and the second distance (reference movement distance of the own vehicle 50) are used as the thresholds which are the determination criteria for the determination of abnormality in the driving assistance control. According to the driving assistance device, when it is determined that the oscillation characteristic of the reverberation has changed, at least one of the shortening of the first distance and the extension of the second distance is performed. This allows the driving assistance device in accordance with the present embodiment to suppress the erroneous determination that an abnormality has occurred in the driving assistance control.

When flowing water is present on the surface of the oscillator 31, there is a possibility that the erroneous detection of short distance occurs due to the flowing water and the safety device is erroneously activated. Meanwhile, according to the driving assistance device in accordance with the present embodiment, when it is determined that the oscillation characteristic of the reverberation has changed (when the erroneous detection of short distance due to the flowing water may occur), the activation of the safety device is restricted (the safety device is caused to be less likely to be activated). This allows the driving assistance device in accordance with the present embodiment to suppress the erroneous activation of the safety device.

According to the driving assistance device in accordance with the present embodiment, when it is determined that the oscillation characteristic of the reverberation has changed, the mask time Tm is extended and after the extended mask time Tm has elapsed, the process for detecting an object and the process for calculating a distance to the object are started. This allows the driving assistance device to suppress the erroneous detection of short distance occurring due to the flowing water. Consequently, according to the driving assistance device in accordance with the present embodiment, the activation of the safety device is restricted and it is possible to suppress the erroneous activation.

According to the driving assistance device in accordance with the present embodiment, when it is determined that the oscillation characteristic of the reverberation has changed, the reference number of acquisitions of the distance for a single object, which is one of the conditions for activating the safety device, is increased. This allows the driving assistance device in accordance with the present embodiment to suppress the erroneous activation of the safety device.

When flowing water is present on the surface of the oscillator 31, there is a possibility that object detectability is reduced and an object located at a short distance cannot be detected. Thus, in such a case, the opportunity for driving assistance control may be reduced. Meanwhile, according to the driving assistance device in accordance with the present embodiment, when it is determined that the oscillation characteristic of the reverberation has changed (when the object detectability may be reduced), the decrease in object detectability is suppressed. Thus, according to the driving assistance device, an object located at a short distance is detectable even when flowing water is present. This allows the driving assistance device in accordance with the present embodiment to suppress the decrease in opportunity for driving assistance control.

According to the driving assistance device in accordance with the present embodiment, when it is determined that the oscillation characteristic of the reverberation has changed, the correction for amplification of the amplitude of the wave reception signal is made. Alternatively, according to the driving assistance device, the threshold (threshold to be compared with the amplitude of the wave reception signal) which is a criterion for adjusting the intensity of the oscillation is lowered. This allows the driving assistance device in accordance with the present embodiment to suppress the decrease in object detectability.

According to the driving assistance device in accordance with the present embodiment, when it is determined that the oscillation characteristic of the reverberation has changed, the intensity of the oscillation of the oscillator 31 is increased. This allows the driving assistance device in accordance with the present embodiment to suppress the decrease in object detectability.

According to the driving assistance device in accordance with the present embodiment, when it is determined that the oscillation characteristic of the reverberation has changed, the wave transmission period Tc for the ultrasonic wave is shortened. This allows the driving assistance device in accordance with the present embodiment to suppress the decrease in object detectability.

Other Embodiments

The aforementioned embodiment is configured such that three processes, that is, the suppression of the erroneous determination of abnormality, the suppression of the erroneous activation of the safety device, and the suppression of the decrease in object detectability in the driving assistance control are performed as the processes for changing the execution mode. However, the configuration is not limited to this. An example of another embodiment only needs to be configured such that at least one of the three processes is performed.

The aforementioned embodiment is configured such that it is determined that the oscillation characteristic of the reverberation has changed, when the abrupt change occurs in which the duration Tr and the frequency f of the reverberation simultaneously greatly change. However, the configuration is not limited to this. As an example of another embodiment, two abrupt changes in the respective duration Tr and frequency f can occur at different timings instead of the simultaneous timing. According to an example of another embodiment, it can be determined that the oscillation characteristic of the reverberation has changed, for example, when the duration Tr of the reverberation abruptly changes, and then the frequency f of the reverberation abruptly changes while the characteristic change in the duration Tr continues.

The aforementioned embodiment is configured as below. That is, the sonar circuit 32 amplifies the received wave reception signal and performs the filtering process thereof and compares the voltage level of the amplitude of the processed wave reception signal with the threshold, and then when the amplitude of the wave reception signal is greater than the threshold, the sonar circuit 32 transmits, to the ECU 10, the detection information indicating that an object has been detected. However, the configuration is not limited to this. According to an example of another embodiment, the voltage level itself of the amplitude of the processed wave reception signal can be transmitted to the ECU 10. According to an example of another embodiment, on the basis of the received wave reception signal, the ECU 10 can perform detection of an object and calculation of a distance to the object, detection of the duration Tr and the frequency f of the reverberation, and the like.

REFERENCE SIGNS LIST

10 . . . ECU, 11 . . . Drive section, 12 . . . Intensity adjustment section, 13 . . . Information acquisition section, 13a . . . Distance acquisition section, 15 . . . Reverberation acquisition section, 16 . . . Characteristic determination section, 17 . . . Mode changing section, 17a . . . Determination regulation section, 17b . . . Activation regulation section, 17c . . . Performance degradation suppression section, 18 . . . Abnormality determination section, 19 . . . Avoidance control section, 20 . . . Ultrasonic sensor, 31 . . . Oscillator, 50 . . . Own vehicle.

The invention claimed is:

1. A driving assistance device that detects an object around an own vehicle by using an ultrasonic sensor mounted on the own vehicle and performs driving assistance control of the own vehicle, the driving assistance device comprising:
a drive section that drives an oscillator of the ultrasonic sensor so that ultrasonic waves are transmitted from the oscillator;
a reverberation acquisition section that acquires a duration and a frequency of reverberation occurring in association with driving of the oscillator;
a characteristic determination section that determines, on a basis of the duration and the frequency which have been acquired by the reverberation acquisition section, whether an oscillation characteristic of the reverberation has changed; and
a mode changing section that changes, on a basis of a result of determination of the oscillation characteristic which has been made by the characteristic determination section, at least one execution mode of the driving assistance control and determination of abnormality for determining whether an abnormality is present in the driving assistance control.

2. The driving assistance device according to claim 1, wherein:
the characteristic determination section determines that the oscillation characteristic has changed when the duration has changed to become longer and the frequency has changed to become lower.

3. The driving assistance device according to claim 1, wherein:
the characteristic determination section determines that the oscillation characteristic has changed when an amount of change from a previous value to a current value in each of the duration and the frequency exceeds predetermined values.

4. The driving assistance device according to claim 1, further comprising:
a distance acquisition section that acquires a distance from the own vehicle to an object, the distance being calculated on a basis of reflected waves of the ultrasonic waves reflected by the object; and
an abnormality determination section that determines, on a basis of the distance acquired by the distance acquisition section and a movement state of the own vehicle at a current time point, whether an abnormality is present in the driving assistance control,
the mode changing section including a determination regulation section, and when the characteristic determination section determines that the oscillation characteristic has changed, the determination regulation section restricts determination by the abnormality determination section that the abnormality has occurred.

5. The driving assistance device according to claim 4, wherein:
when the characteristic determination section determines that the oscillation characteristic has changed, the determination regulation section stops the determination of abnormality by the abnormality determination section.

6. The driving assistance device according to claim 4, wherein:
the abnormality determination section determines that an abnormality has occurred in the driving assistance control when the own vehicle has moved more than a predetermined second distance while the distance acquired by the distance acquisition section is less than a predetermined first distance; and
when the characteristic determination section determines that the oscillation characteristic has changed, the determination regulation section performs at least one of shortening of the first distance and extension of the second distance.

7. The driving assistance device according to claim 1, further comprising:
a distance acquisition section that acquires a distance from the own vehicle to an object, the distance being calculated on a basis of reflected waves of the ultrasonic waves reflected by the object; and
an avoidance control section that controls, on a basis of the distance acquired by the distance acquisition section, activation of a safety device in order to avoid a collision of the own vehicle with the object or reduce damage from the collision,
the mode changing section including an activation regulation section, and when the characteristic determination section determines that the oscillation characteristic has changed, the activation regulation section restricts activation of the safety device by the avoidance control section.

8. The driving assistance device according to claim 7, wherein:
the distance is information that is calculated after a predetermined mask time has elapsed from transmission of the ultrasonic waves from the oscillator; and
when the characteristic determination section determines that the oscillation characteristic has changed, the activation regulation section extends the mask time.

9. The driving assistance device according to claim 7, wherein:
the avoidance control section activates the safety device when the distance acquisition section acquires, for a single object, the distance within a predetermined range for the predetermined number of times; and
when the characteristic determination section determines that the oscillation characteristic has changed, the activation regulation section increases the predetermined number of times that is a criterion for the number of acquisitions of the distance.

10. The driving assistance device according to claim 1, further comprising:
an information acquisition section that acquires detection information on detection of an object which has been detected on a basis of reflected waves of the ultrasonic waves reflected by the object,
the mode changing section including a performance degradation suppression section, and when the characteristic determination section determines that the oscillation characteristic has changed, the performance degradation suppression section suppresses a decrease in object detectability occurring due to a change in the oscillation characteristic determined by the characteristic determination section.

11. The driving assistance device according to claim 10, wherein:
the detection information is information on the object which has been detected on a basis of a result of a comparison between an amplitude of the reflected waves and a predetermined threshold; and
when the characteristic determination section determines that the oscillation characteristic has changed, the performance degradation suppression section makes a correction for amplification of the amplitude of the reflected waves or lowers the threshold.

12. The driving assistance device according to claim 10, further comprising:
   an intensity adjustment section that adjusts an intensity of oscillation of the oscillator,
   when the characteristic determination section determines that the oscillation characteristic has changed, the performance degradation suppression section causes the intensity adjustment section to increase the intensity of the oscillation of the oscillator.

13. The driving assistance device according to claim 10, wherein:
   the drive section transmits the ultrasonic waves within a predetermined wave transmission period;
   the detection information is information on the object which has been detected on a basis of a plurality of the reflected waves acquired at intervals of the wave transmission period; and
   when the characteristic determination section determines that the oscillation characteristic has changed, the performance degradation suppression section shortens the wave transmission period.

14. The driving assistance device according to claim 1, wherein:
   when the characteristic determination section determines that the oscillation characteristic has changed, the mode changing section changes the execution mode for a predetermined time period after the characteristic determination section determines that the oscillation characteristic has changed.

15. A driving assistance method performed by a driving assistance device that detects an object around an own vehicle by using an ultrasonic sensor mounted on the own vehicle and performs driving assistance control of the own vehicle, the driving assistance method comprising the steps of:
   driving an oscillator of the ultrasonic sensor so that ultrasonic waves are transmitted from the oscillator;
   acquiring a duration and a frequency of reverberation occurring in association with driving of the oscillator;
   determining, on a basis of the duration and the frequency which have been acquired, whether an oscillation characteristic of the reverberation has changed; and
   changing, on a basis of a result of determination of the oscillation characteristic, at least one execution mode of the driving assistance control and determination of abnormality for determining whether an abnormality is present in the driving assistance control.

* * * * *